Dec. 30, 1930. P. S. THOMSEN 1,786,464
SHOVEL FOR POTATO DIGGERS
Filed Jan. 5. 1929
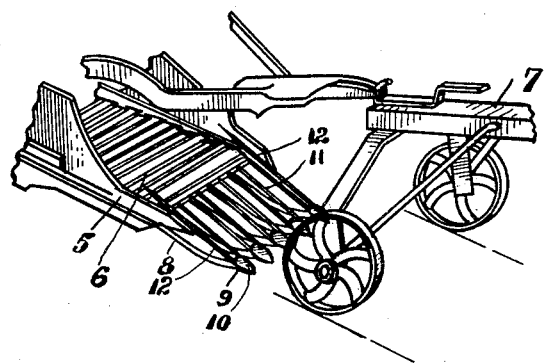
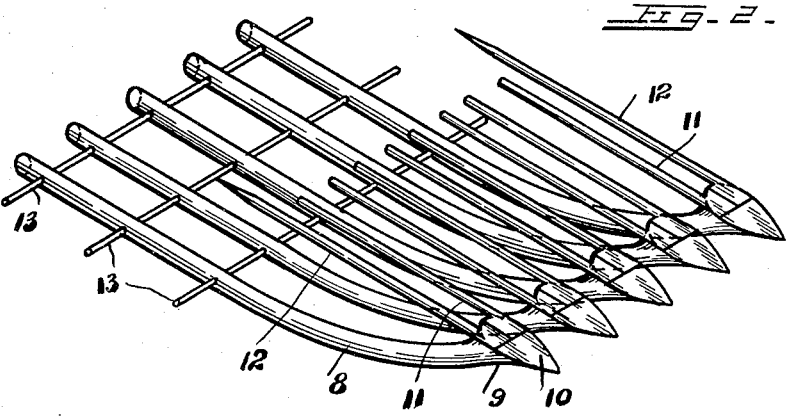
Inventor
PETER SKOVBY THOMSEN
By Frederick C. Bromley
Attorney.

Patented Dec. 30, 1930

1,786,464

UNITED STATES PATENT OFFICE

PETER SKOVBY THOMSEN, OF GREAT VILLAGE, NOVA SCOTIA, CANADA

SHOVEL FOR POTATO DIGGERS

Application filed January 5, 1929. Serial No. 330,441.

The invention relates to improvements in shovels of potato diggers as described in the present specification and shown in the accompanying drawings which form part of the same.

The object of the present invention is to produce a shovel for a potato digger that will reduce loss of potatoes when digging in weedy or loose dry soil; and generally to provide a highly efficient shovel capable of rendering good service under adverse ground conditions.

The invention consists essentially of spaced horizontal bars fitted to the frame of the machine beneath the elevator and projecting forwardly thereof towards the ground and terminating in broad flat heads suitably inclined. Guide rods extend from the heads to the upper side of the elevator. The bars plow the soil by means of their heads and the uprooted potato plants are conveyed to the elevator by means of the guide rods which are closely spaced to preclude potatoes falling therebetween but yet allow loose soil to freely filter through.

Referring to the accompanying drawings, Figure 1 is a perspective view depicting the forward portion of an ordinary potato digger to which the present invention is shown applied.

Figure 2 is a perspective view of the invention detached from the potato digger.

In the drawings, the reference numeral 5 denotes generally the usual frame that carries the various operating parts including the endless conveyor 6, or what is better known as the elevator. This takes the uprooted plants from the anterior shovel as is well understood in the art. 7 is the fore-carriage that supports the front end of the frame.

The shovel comprises the substantially longitudinally directed bars 8 suitably spaced apart from one another. These bars extend downwardly and forwardly from beneath the receiving end of the elevator and are preferably slightly upwardly curved as best discernible from an inspection of Figure 2. The frontal ends 9 are enlarged and flared to produce broad flat heads 10. The heads are rearwardly inclined and pointed to facilitate their penetration of the ground.

The bars are illustrated as being of equal length so that their heads are situated abreast of one another; this, however, is not essential since they may be otherwise arranged without departing from the substance of the invention.

The guide rods 11 of a less substantial structure than the bars 8 are spaced apart a lesser distance than the bars aforesaid with a view to precluding potatoes dropping therethrough, there preferably being two such rods to each and every bar. The rods may be constructed integrally with the heads thereof or secured to the same in any manner. They are directed upwardly on a suitable gradient to the upper side of the elevator, the two outer rods 12, 12, being slightly longer than the others to prevent weeds falling off.

In the use of this invention, the broad flat heads 10 of the bars 8 readily penetrate the ground and uproot the potato plants in their path, while the guide rods 11 function to convey them to the elevator. The grating formed by the rods checks the natural tendency of the tubers to roll off thus safely guiding them onto the elevator. It is to be clearly understood that the headed bars actually do the plowing, while the rods function as an apron to guide the potato plants onto the elevator.

Furthermore, it will be manifest that the bars will have to be rigidly affixed in the machine frame 5. This can, of course, be accomplished in many ways but that shown in the drawings consists of a number of cross-bars 13 which pass through the bars 8 and are secured in the opposing sides of the frame.

It will be manifest that in addition to the foregoing advantages, this shovel requires only a light draft which is an important feature when working in clay soil.

What I claim is:—

A shovel for a potato digger having an endless elevator, said shovel comprising longitudinally directed spaced bars extending forwardly and downwardly from beneath the receiving end of the elevator, said bars being slightly upwardly curved, heads integral with the frontal ends of said bars, said heads consisting of enlarged members flared to produce broad flat penetrating surfaces, and guide rods extending upwardly and rearwardly from the said heads to the upper side of the elevator, there being at least two guide rods to each head to prevent potatoes dropping through, said guide rods being of a less substantial structure than the bars so as to constitute an apron for potatoes uprooted thereby.

Signed at Great Village, Nova Scotia, Canada, the tenth day of December, 1928.

PETER SKOVBY THOMSEN.